United States Patent Office 3,287,452
Patented Nov. 22, 1966

3,287,452
SYNTHESIS OF ADENINE AND OF
4,5-DICYANOIMIDAZOLE
Hachiro Wakamatsu, Tokyo, Tadaomi Saito, Kawasaki-shi, Kanagawa-ken, Izumi Kumashiro, Yokohama-shi, Kanagawa-ken, and Tadao Takenishi and Yoshitaka Yamada, Tokyo, Japan, assignors to Ajinomoto Co., Inc., Tokyo, Japan
No Drawing. Filed Mar. 17, 1964, Ser. No. 352,634
Claims priority, application Japan, Sept. 5, 1963, 38/46,584; Mar. 20, 1963, 38/13,284; Feb. 26, 1964, 39/10,145
13 Claims. (Cl. 260—252)

This invention relates to the synthesis of adenine and 4,5-dicyanoimidazole, and more particularly to the synthesis of adenine and 4,5-dicyanoimidazole from inorganic reactants.

It has recently been shown by J. Oro and his co-workers (Nature, 191, 1193, (1961); Arc. Biochem. Biophys., 94, 217 (1961); 96, 293 (1962)), that adenine and other nitrogen bearing organic compounds are formed when hydrogen cyanide and aqueous ammonia are reacted with each other. The amount of adenine formed is small, though significant, and the yield based on the hydrogen cyanide employed is too low to permit production of adenine on a commercial scale by this method. Most of the hydrogen cyanide originally present is lost in the form of resinous polymers and other products of complex structure lacking utility.

We have found that ammonia and hydrogen cyanide can be condensed in such a manner that about one half of the cyanide employed is converted to adenine and another product having known utility, 4,5-dicyanoimidazole, and additional amounts of cyanide may be recovered unchanged. We have succeeded in substantially suppressing the polymerization reactions which consume most of the hydrogen cyanide in the known method. It has been established that ammonia and hydrogen cyanide react with each other predominantly to produce adenine (I) and 4,5-dicyanoimidazole (II) when the reaction is

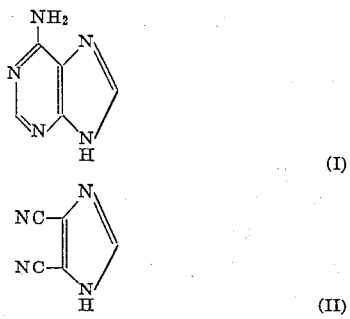

carried out under substantially anhydrous conditions, that is, in the absence of an amount of water greater than 10 mole percent of the combined amount of ammonia and hydrogen cyanide present.

The hydrogen cyanide component of the reaction mixture may be anhydrous hydrogen cyanide in liquid or gaseous form, or a mixture of a salt of hydrogen cyanide, preferably an alkali metal salt, with an ammonium salt of an acid stronger than hydrocyanic acid, such as formic, acetic, hydrochloric, sulfuric, or nitric acid. Approximately equivalent amounts of the alkali metal cyanide and of the ammonium salt of a stronger acid are preferably employed. An excess of alkali metal cyanide promotes the formation of adenine but reduces the yield of 4,5-dicyanoimidazole.

Liquid ammonia is provided in a mole ratio of at least 2:1 to the hydrogen cyanide present or available from the mixture of an alkali metal cyanide and the ammonium salt of a stronger acid. The yield of adenine and 4,5-dicyanoimidazole increases with an increasing ratio $NH_3:HCN$ until a maximum is reached, and decreases with a further increase in the ratio. Under otherwise favorable operating conditions, best yields of adenine are obtained at ratios of about 3:1 to 10:1, and best yields of 4,5-dicyanoimidazole at mole ratios above 10, and as high as 40 moles of liquid $NH_3$ per mole of HCN available.

The influence of the mole ratio $NH_3:HCN$ is illustrated by Table 1 which lists the yields of adenine and 4,5-dicyanoimidazole (DCI) on the basis of the HCN originally present when mixtures of hydrogen cyanide and liquid ammonia were heated at 80° C. for 20 hours in a stainless steel autoclave having a capacity of 20 milliliters.

Table 1

| Run No. | Reactants | | Mole Ratio $NH_3:HCN$ | Yield | |
|---|---|---|---|---|---|
| | HCN (millimole) | Liq. $NH_3$ (ml.) | | Adenine (Percent) | DCI (Percent) |
| 1 | 31.9 | 1.6 | 1.83 | 1.9 | |
| 2 | 35.0 | 3.5 | 3.65 | 14.4 | 4.5 |
| 3 | 35.7 | 4.3 | 4.38 | 20.1 | 12.1 |
| 4 | 37.6 | 5.3 | 5.11 | 21.5 | 14.6 |
| 5 | 31.9 | 5.8 | 6.53 | 23.2 | 16.5 |
| 6 | 37.1 | 7.4 | 8.30 | 23.6 | 21.0 |
| 7 | 17.0 | 5.1 | 10.95 | 20.5 | 23.1 |

The influence of the mole ratio of liquid ammonia to the source of hydrogen cyanide is also shown in Table 2 which lists results of experimental runs in which 44 millimoles sodium cyanide and 40 millimoles ammonium chloride were reacted with the indicated amounts of liquid ammonia in stainless steel autoclaves at 120° C. for 10 hours.

Table 2

| Run No. | Amount of liq. $NH_3$ (ml.) | Capacity of Autoclave (ml.) | Mole ratio $NH_3$:NaCN | Yield | |
|---|---|---|---|---|---|
| | | | | Adenine (Percent) | DCI (Percent) |
| 1 | 2.0 | 20 | 1.83 | 12.5 | |
| 2 | 4.0 | 20 | 3.65 | 19.5 | 5.1 |
| 3 | 5.6 | 20 | 5.11 | 20.2 | 5.9 |
| 4 | 6.4 | 20 | 5.84 | 21.8 | 6.4 |
| 5 | 7.2 | 20 | 6.35 | 21.5 | 6.8 |
| 6 | 8.0 | 20 | 7.30 | 20.9 | 7.2 |
| 7 | 8.8 | 20 | 8.03 | 20.2 | 7.8 |
| 8 | 9.6 | 20 | 8.76 | 19.0 | 9.5 |
| 9 | 12.0 | 20 | 10.95 | 16.2 | 11.0 |
| 10 | 15.0 | 50 | 18.25 | 14.1 | 16.5 |
| 11 | 40.0 | 50 | 36.5 | 13.3 | 20.6 |
| 12 | 64.0 | 100 | 58.4 | 11.6 | 21.0 |
| 13 | 120.0 | 200 | 109.5 | 7.6 | 17.0 |

The rate of the reaction which leads to adenine and 4,5-dicyanoimidazole is rather low at temperatures lower than 60° C. The decomposition of adenine becomes fairly rapid at temperatures above 200° C., and that of 4,5-dicyanoimidazole is almost as high as the rate of formation at about 150° C. This is evident from Table 3 which lists the results of experimental runs made at various temperatures in a one-liter autoclave containing 1 mole hydrogen cyanide and 500 milliliters liquid ammonia. In all runs, the time was selected for best combined yields of adenine and 4,5-dicyanoimidazole.

*Table 3*

| Temperature, °C | 60 | 80 | 100 | 120 | 140 | 160 |
|---|---|---|---|---|---|---|
| Reaction time, hours | 30 | 30 | 12 | 8 | 6 | 4 |
| Adenine Yield, percent | 4 | 20 | 17 | 14 | 13 | 12 |
| Yield of DCI, percent | 4 | 25 | 29 | 21 | 11 | Trace |

If a practical yield of adenine is desired, the reaction temperature therefore should be between 60° and 200° C., and best results are obtained from hydrogen cyanide and ammonia at 70° to 120° C. Highest adenine yields are obtained from alkali metal cyanides, ammonium salts of stronger acids, and ammonia at the somewhat higher temperatures between 100 and 150° C. The middle and lower portions of these temperature ranges are preferred when a high yield of 4,5-dicyanoimidazole is to be obtained simultaneously.

The reaction period providing the highest yields is inversely related to the reaction temperature, and is generally between about 10 minutes, and not much more than 24 hours. The pressure should be high enough to maintain the reactants at least partly in the liquid state.

Water should be excluded from the reaction mixture as far as practical. The influence of water in the reaction mixture on the formation of adenine from a mixture of 0.044 mole sodium cyanide, 0.04 mole ammonium chloride, and 0.29 mole (8.0 milliliters) liquid ammonia at 120° C. in 10 hours is shown in Table 4. The reactions were performed in a stainless steel autoclave having a capacity of 20 milliliters, and the adenine yield is based on the equivalent amount of sodium cyanide originally present.

*Table 4*

| Mole ratio $H_2O$:NaCN | 0 | 0.05 | 0.3 | 1.0 | 1.5 | 2.0 |
|---|---|---|---|---|---|---|
| Mole ratio $H_2O$:(NaCN+$NH_3$) | 0 | 0.006 | 0.04 | 0.13 | 0.20 | 0.26 |
| Adenine yield, percent | 23.3 | 20.2 | 13.2 | 2.6 | 1.0 | Trace |

The effect of water in the reaction mixture on the simultaneous yield of adenine and 4,5-dicyanoimidazole is illustrated on Table 5 which lists yields of these compounds in percent equivalent of the originally present hydrogen cyanide. The reaction mixture was prepared from the indicated amount of water, 0.05 mole (1.35 grams) hydrogen cyanide, and 0.36 mole (10 milliliters) liquid ammonia. The temperature of the reaction was 80° C., the reaction period 20 hours, and the autoclave capacity 20 milliliters.

*Table 5*

| Mole ratio 100 $H_2O$:(HCN+$NH_3$) | 0 | 1 | 2 | 3 | 4 | 5 | 10 | 15 |
|---|---|---|---|---|---|---|---|---|
| Adenine yield, percent | 23 | 20 | 19 | 17 | 16 | 15 | | |
| DCI yield, percent | 21 | 18 | 16 | 14 | 12 | 12 | 7 | 4 |

Tables 4 and 5 are in agreement in showing that the presence of about 10 moles of water per 100 moles of ammonia plus hydrogen cyanide or sodium cyanide reduces the yield of adenine to almost zero, and so sharply reduces the yield of 4,5-dicyanoimidazole as to make the process uneconomical. This relationship may also be expressed otherwise: the number of moles of water present in the reaction mixture should be smaller than that of the hydrogen cyanide or of the alkali metal cyanide present.

Whether the reaction is carried out in the absence of measurable amounts of water or whether a small amount of moisture is tolerated in the reaction mixture depends on economical factors, such as the cost of dehydrating available reagents, and the value of the product.

Inert organic solvents are also detrimental when present in the reaction mixture but their effects are smaller by at least one order of magnitude than those of water. Solutions of reactants in small amounts of organic solvents may thus be used instead of undiluted reactants, if necessary. Solvents which were not found to cause a major loss in yield when present in small amounts include such aromatic hydrocarbons as benzene, toluene, xylene; the lower alkanols, such as methanol, ethanol, and several butanols; polyhydric alcohols, such as ethylene glycol, propylene glycol and glycerin; the commercially employed ethers of polyhydric alcohols, such as methyl cellosolve; and lower alkyl ethers, for example, diethyl ether and dipropyl ether.

The reaction mixture may be worked up in any desired manner to recover adenine and 4,5-dicyanoimidazole therefrom. When an alkali metal cyanide and the ammonium salt of a stronger acid are employed as a source of hydrogen cyanide, the resulting alkali metal salt of the stronger acid must be removed from the reaction mixture. The unreacted hydrogen cyanide and ammonia are evaporated and may be recovered, if so desired. The separate recovery of adenine and 4,5-dicyanoimidazole from the residue may be based on the solubility properties of the compounds.

4,5-dicyanoimidazole is soluble in the lower alkanols, such as methanol, ethanol, propanol, the butanols; in the lower aliphatic ethers, such as diethyl ether; in cyclic ethers, such as dioxane; and also in cold water. Adenine is insoluble or only sparingly soluble in these solvents.

Both adenine and 4,5-dicyanoimidazole are soluble in hot water and they may, therefore, be extracted from the afore-mentioned residue by hot water, and separated from each other and the inorganic salts present by solvent extraction of the aqueous solution.

The two compounds also differ in their adsorption on ion exchange resins. 4,5-dicyanoimidazole is adsorbed from aqueous solutions by weakly basic anion exchange resins, such as Dowex-3, Amberlite IR-4B, and Amberlite IR-45 when in the OH-form, whereas adenine is not adsorbed. 4,5-dicyanomidazole is not adsorbed by strongly acidic cation exchange resins, such as Amberlite IR-120 and Dowex 50 in the H-form, whereas adenine is strongly adsorbed by these resins.

When salts of heavy metal ions, such as lead and mercury, are added to an aqueous solution of adenine and 4,5-dicyanoimidazole at a pH near 7, the latter is selectively precipitated as the lead or mercury salt. Other methods of separating adenine from 4,5-dicyanoimidazole will readily suggest themselves to those skilled in the art, and are partly shown in the following examples which merely illustrate this invention but are not intended to limit the same. The specific methods employed in working up the reaction mixtures of the several examples were chosen to obtain one, the other, or both compounds at high yield or in a state of purity desired.

EXAMPLE 1

30 milliliters liquid ammonia and 4 milliliters liquid hydrogen cyanide were charged to a 50 milliliter stainless steel autoclave at low temperature, and the sealed autoclave was maintained 20 hours at 80° C. The unreacted ammonia and hydrogen cyanide were distilled off, and the residue was repeatedly extracted with small amounts of hot water. The combined extracts were filtered. The filtrate had a volume of 150 milliliters. Its adenine content was determined by paper chromatography and found to be 0.6 gram, corresponding to an adenine yield of 22% on the basis of the hydrogen cyanide originally present.

Picric acid was added to a portion of the filtrate, and the precipitate formed was recrystallized. There were obtained yellow crystals which melted with decomposition at 280° C. A known sample of adenine picrate had the same melting point, and did not depress the melting point of the yellow product upon admixing. The yellow crystals were further identified as adenine picrate by their infrared spectrum (potassium bromide tablet method) and by elementary analysis.

Calculated for $C_{11}H_8N_8O_7$: C, 36.44%; H, 2.22%; N, 30.75%. Found: C, 36.36%; H, 2.08%; N, 30.65%.

The remainder of the aqueous filtrate was evaporated to dryness, and the residue was subjected to repeated sublimation in a vacuum to isolate the adenine. Colorless crystals were ultimately obtained. They showed the infrared spectrum of adenine (potassium bromide tablet method) and the following elementary analysis.

Calculated for $C_5H_5N_5$: C, 44.45%; H, 3.73%; N, 51.82%. Found: C, 44.31%; H, 3.79%; N, 51.70%.

EXAMPLE 2

A 20 ml. autoclave equipped with a stirrer was charged with 2.16 g. (0.04 mole) powdered anhydrous sodium cyanide, 2.14 g. (0.04 mole) ammonium chloride, and 8 milliliters anhydrous liquid ammonia. The resulting mixture was kept in the closed autoclave at 120° C. for 10 hours with stirring.

The reaction mixture was evaporated until all excess ammonia was removed, and was repeatedly extracted with a total of 100 milliliters hot water. The combined extracts were filtered. An amount of adenine corresponding to a yield of 23.3%, based on the sodium cyanide used, was found in the filtrate by paper chromatography. The filtrate was evaporated to a volume of 15 milliliters, and the concentrate was left overnight in an icebox. Pale yellow crystals weighing 0.31 gram were recovered from the mother liquor by filtration. They contained 87% adenine.

The crude product was dissolved in hot water, treated with activated charcoal, and again crystallized. The colorless crystals obtained had an infrared spectrum identical with that of pure adenine.

EXAMPLE 3

The procedure described in Example 2 was repeated with 2.21 grams sodium cyanide containing about 2% moisture, and 2.16 grams ammonia. The adenine yield determined by paper chromatography was only 19.9%, and the crude crystals weighed 0.28 grams and contained 83% adenine.

EXAMPLE 4

A mixture of 5.3 grams (0.11 mole) anhydrous sodium cyanide, 5.35 g. (0.10 mole) ammonium chloride, and 16 milliliters dried liquid ammonia was heated in an autoclave for 15 hours to 120° C. The reaction mixture obtained was worked up as described in Example 2. Its adenine content corresponded to a yield of 20% based on the sodium cyanide employed. The crude adenine recovered weighed 0.6 gram. Pure crystals having the infrared spectrum of adenine were obtained by recrystallization.

Closely similar results were obtained when ammonium chloride was replaced by equivalent amounts of ammonium sulfate and ammonium nitrate.

EXAMPLE 5

A mixture of 7.16 g. (0.11 mole) potassium cyanide, 7.71 g. (0.10 mole) ammonium acetate, and 20 milliliters liquid ammonia was heated in a 100 ml. autoclave, to 120° C. for 6 hours with stirring. When the reaction was completed, ammonia was distilled off, and the residue was extracted repeatedly with 100 milliliters hot water. The combined extracts were filtered and were found to contain adenine in an amount corresponding to a yield of 12% based on the original potassium cyanide.

The filtrate was evaporated to 40 milliliters, and stored in an icebox overnight. Pale yellow crystals were separated from the mother liquor by filtration. They weighed 0.42 gram and contained 85% adenine.

EXAMPLE 6

Reaction mixtures of 27 g. (1.0 mole) liquid hydrogen cyanide, 1.0 g. (0.02 mole) sodium cyanide, and 150 ml. liquid ammonia were sealed in respective 300 ml. stainless steel autoclaves. The autoclaves were held at the temperatures listed in Table 6 for the periods indicated.

The autoclaves were then opened, and ammonia was removed from the contents by evaporation. The residues were repeatedly extracted with hot water (about one liter), filtered, and analyzed for adenine content by paper chromatography. The yields of adenine based on the combined hydrogen and sodium cyanides are tabulated.

Table 6

| Temperature, ° C | 80 | 100 | 120 | 140 | 160 |
|---|---|---|---|---|---|
| Time, hours | 20 | 12 | 8 | 6 | 4 |
| Adenine yield, percent | 20.6 | 19.5 | 17.2 | 15.6 | 13.3 |

EXAMPLE 7

A mixture of 6.31 g. (0.1 mole) ammonium formate, 5.39 g. (0.11 mole) sodium cyanide, and 16 milliliters liquid ammonia was heated in a 20 ml. stainless steel autoclave to 120° C. for 8 hours. Excess ammonia was removed from the reaction mixture by evaporation together with the unreacted hydrogen cyanide. The residue was extracted with 200 milliliters hot water, and the filtered extract contained an amount of adenine corresponding to 20% of the sodium cyanide originally present. The extract was concentrated to 40 milliliters and stored in an ice box overnight. Pale yellow crystals were separated from the mother liquor by filtration. They weighed 0.73 gram and contained 81.5% adenine.

EXAMPLE 8

A mixture of 2.156 g. (0.044 mole) anhydrous sodium cyanide, 2.140 g. (0.040 mole) ammonium chloride, 6.4 ml. dried liquid ammonia, and 50 ml. anhydrous methanol was heated in a 100 milliliter autoclave to 120° C. for eight hours. An extract of the reaction mixture, prepared in the manner of Example 2, was found to contain an amount of adenine corresponding to 5% of the sodium cyanide originally present. The crude adenine recovered from the extract weighed 50 milligrams.

EXAMPLE 9

A mixture of 27 grams (1 mole) anhydrous liquid hydrogen cyanide and 50 milliliters liquid ammonia was heated twelve hours in a 1000 milliliter stainless steel autoclave to 100° C. with shaking. Unreacted hydrogen cyanide and ammonia were removed from the reaction mixture formed by evaporation. The black powdery residue was extracted with ethyl ether in a soxhlet extractor. Upon evaporation, the ether extract left a crystalline residue of 6.4 grams crude 4,5-dicyanoimidazole, corresponding to 27% of the original hydrogen cyanide. When the crude product was recrystallized from a small amount of water, there were obtained colorless crystals of pure 4,5-dicyanoimidazole having a melting point of 174°–175° C. Elementary analysis confirmed the identification.

Calculated for $C_5H_2N_4$: C, 50.85%; H, 1.71%; N, 47.45%. Found: C, 51.00%; H, 1.85%; N, 47.38%.

The crystals were further identified as 4,5-dicyanoimidazole by paper chromatography with a solvent mixture of n-propanol, concentrated aqueous ammonia, and water in a ratio of 20:12:3 by volume, and with a mixture of n-butanol, acetic acid, and water (4:1:1). A mono-spot having an $R_f$ value identical with that of a known sample of 4,5-dicyanoimidazole was obtained. The known sample and the crystals also gave identical U.V. absorption spectra in aqueous solution at pH values of 1 and 13, and identical infrared spectra by the KBr tablet method.

The ether-insoluble material was extracted with hot water, and yielded 4.3 grams crude adenine, corresponding to an adenine yield of 16% based on the hydrogen cyanide orginally present.

EXAMPLE 10

A mixture of 27 g. (1 mole) anhydrous liquid hydrogen cyanide and 1000 ml. liquid ammonia was heated with shaking for 15 hours to 100° C. in a stainless steel autoclave having a capacity of 2000 milliliters. Unreacted ammonia and hydrogen cyanide were removed from the reaction mixture by evaporation, and the black powdery residue was extracted with 2,000 ml. hot water.

The extract was passed over a first column of strongly acid cation exchange resin Amberlite IR–120 in the H-form, and thereafter over a second column of the weakly basic anion exchange resin Amberlite IR–4B in the OH-form.

The first column was eluted with 1–N ammonium hydroxide solution. The effluent was evaporated to dryness, and 4.45 grams crude adenine, containing 85% pure adenine, were obtained, corresponding to 14% of the hydrogen cyanide originally present.

The second column was eluted with 0.1 N sulfuric acid. The effluent was neutralized with saturated aqueous barium hydroxide solution and filtered. The filtrate was evaporated, and there were obtained 6.9 grams 4,5-dicyanoimidazole, corresponding to 29% of the original hydrogen cyanide.

While the invention has been described with particular reference to specific embodiments, it is to be understood that it is not limited thereto, but is to be construed broadly and restricted solely by the scope of the appended claims.

What we claim is:

1. A method of producing adenine and 4,5-dicyanoimidazole which comprises reacting a source of hydrogen cyanide with ammonia in the liquid state in the absence of an amount of water greater than ten mole percent of the combined amounts of said hydrogen cyanide and said ammonia at a temperature of 60° to 150° C., the mole ratio of said ammonia to said hydrogen cyanide being at least two to one.

2. A method as set forth in claim 1, wherein said source is liquid hydrogen cyanide.

3. A method as set forth in claim 1, wherein said source is a mixture of an alkali metal cyanide with an approximately equivalent amount of the ammonium salt of an acid stronger than hydrogen cyanide.

4. A method as set forth in claim 3, wherein said stronger acid is selected from the group consisting of formic, acetic, hydrochloric, sulfuric, and nitric acids.

5. A method as set forth in claim 1, wherein said source and said ammonia are substantially anhydrous.

6. A method as set forth in claim 1, wherein said amount of water is smaller than the mole equivalent of said hydrogen cyanide.

7. A method as set forth in claim 1, wherein said temperature is between 70° and 120° C., and said source is liquid hydrogen cyanide.

8. A method as set forth in claim 1, wherein said temperature is between 100° and 150° C., and said source is an alkali metal cyanide and an ammonium salt of an acid stronger than hydrogen cyanide.

9. A method of producing adenine which comprises reacting a source of hydrogen cyanide with ammonia in the liquid state in the absence of an amount of water greater than ten mole percent of the combined amounts of said hydrogen cyanide and said ammonia at a temperature of 60° to 200° C., the mole ratio of said ammonia to said hydrogen cyanide being at least two to one.

10. A method as set forth in claim 9, wherein said mole ratio is between 3:1 and 10:1.

11. A method as set forth in claim 9, wherein said source of hydrogen cyanide is an ammonium salt of an acid stronger than hydrogen cyanide and an alkali metal cyanide of the group consisting of sodium cyanide and potassium cyanide.

12. A method as set forth in claim 11, wherein said source of hydrogen cyanide includes at least one mole but substantially less than two moles of said alkali metal cyanide for each equivalent of said ammonium salt.

13. A method of producing 4,5-dicyanoimidazole which comprises reacting a source of hydrogen cyanide with ammonia in the liquid state in the absence of an amount of water greater than ten mole percent of the combined amounts of said hydrogen cyanide and said ammonia at a temperature of 60° to 150° C., the mole ratio of said ammonia to said hydrogen cyanide being at least two to one; and recovering 4,5-dicyanoimidazole from the reaction mixture so produced.

References Cited by the Examiner

UNITED STATES PATENTS 2,534,331   12/1950   Woodward _____ 260—309

OTHER REFERENCES

Oro et al.: Archives of Biochemistry and Biophysics, vol. 94, pp. 217–227 (1961).

Oro: Nature, vol. 191, No. 4794, pp. 1193–1194 (1961).

Shaw: Journal of Biological Chemistry, vol. 185, pp. 439–447 (1950).

ALEX MAZEL, *Primary Examiner.*

J. W. ADAMS, *Assistant Examiner.*